United States Patent Office 2,943,101
Patented June 28, 1960

2,943,101

SEPARATION AND PURIFICATION OF METALS

Kurt Peters, Getreidemarkt 9, Vienna VI, Austria

No Drawing. Filed Apr. 23, 1957, Ser. No. 654,445

4 Claims. (Cl. 260—429.1)

This invention relates to a process for purifying metals of groups IIIB, IVB, and VB of the periodic table.

The purification of mixtures of metals or of metallic compounds is seriously complicated when the components of the mixture have substantially similar chemical and physical properties; physical or chemical treatments of the mixture generally affects each of the components to about the same degree with the result that only a very minor purification is obtained. This problem is quite serious in the preparation and purification of the metals of groups IIIB, IVB, and VB of the periodic table (Periodic Table, Handbook of Chemistry and Physics, Chemical Rubber Publishing Co., 1952–1953, 34th edition, pp. 342–343), and particularly in the preparation of the rare earth and transuranium metals. For example the separation of substantially pure neodymium from a mixture of cerite earths by fractional crystallization requires several hundred crystallization steps. Fractional extraction also requires many repetitious operations before a pure product is obtained. Other methods which have been employed such as fractional sublimation of rare earth metal chlorides, fractional adsorption, separation by effecting the migration of ions in aqueous solution by application of an electric field, separation in a magnetic field, ion exchange with base exchangers, and selective solvation, all require a multistage procedure since only a fractional concentration is achieved in each step. Further, in many cases pure fractions are obtainable only in low yields. As a result of the high cost of purifying these metals, their use is not economically feasible for many purposes.

It is an object of this invention to provide a process for purifying the metals of groups IIIB, IVB, and VB of the periodic table.

It is another object of this invention to provide a process for separating and/or purifying the rare earth metals in pure form.

A further object is to provide a process for separating and/or purifying the transuranium metals in pure form.

Other objects will be apparent from the following disclosure and appended claims.

The objects are achieved by effecting the solution of the metal values to be separated as specific complex ions and subsequently effecting a separation of the several species of complex ions resulting from the said solution. The following hypothetical example will serve to illustrate the concept embodied in the present invention.

Metal A and metal B have similar chemical and physical properties. Because the melting points of these metals are so close together, attempts to separate them by crystallization from a melt produces a mixed product only slightly concentrated in the higher-melting component. Thus, many such crystallizations are required to obtain a product of any degree of purity. Similarly, chemical precipitation effects only a slight concentration in any one step since the solubilities of A and B compounds are similar. However, by the method of the present invention, A and B are dissolved as water-soluble complex ions, each complex ion containing either A ions or B ions but not both. These complex ions differ in chemical stability so that by carefully controlled dissociation of the least stable of the complex ions, in the presence of an anion which would normally form an insoluble compound with either A or B except for the fact that they are complexed, leads to the precipitation of the dissociated metal cation to the substantial exclusion of the cation remaining complexed. By this procedure, a good separation may be effected in one, or relatively few, treatments. The procedure is not limited to separating a two-component system but may be employed to effect the separation of a multi-component system provided the necessary degree of control can be maintained.

All of the metals being treated according to the subject process are dissolved in a solution containing a complexing agent. The complexing agents which are satisfactory for the process of the present invention form complex ions with the metals being treated such that only one species of the metals is present in any individual complex ion. In addition, each complex ion contains at least one metal which is substantially dissimilar to the metals being treated, and at least one radical of a polybasic organic acid; each complex ion is identical with respect to these components.

Effective separations have been obtained by employing soluble salts of beryllium, molybdenum, iron, chromium, tungsten, uranium, columbium, tantalum, zirconium, hafnium, vanadium, and particularly aluminum as the source of the complexing dissimilar metal which is to be incorporated in the complex ion. The metal salt to be so employed is selected according to the degree of dissimilarity between the complexing metal and the complexed metal deemed necessary to effect the final separation of these metals; the greater the degree of dissimilarity, the easier and more efficient will be this purification.

The radicals of polybasic organic acids which have been found to be particularly suited for use in the complexing agent of the present invention are those of oxalic acid, tartaric acid, and citric acid.

Where the metals to be separated are solubilized as aluminum oxalato complex ions, very effective separations may be obtained.

The stability of the complex ions, and the solubility of the salts thereof, may be still further modified by incorporating therein uni- or polybasic organic anions and/or inorganic acid anions such as acetate, citrate, nitrate, sulfate, chloride, fluoride and phosphate anions.

Since many of the complex salts are also soluble in organic solvents still another possibility is offered for increasing the difference in stability between the complexes of the metals to be separated.

The methods available for effecting the dissociation of the least stable of the complex ions, with the subsequent removal of the metal to be purified include variation of the pH, addition of a precipitating agent, and dilution. The techniques herein taught require closer control than commonly employed so as to effect crystal growth from solution and thus obtain a clean separation between the components of the mixture. Thus, since the interchange of material between the crystal nucleus and the solution occurs by diffusion through a static film of solution, which film of solution is lean in the least soluble component, time is required to permit adequate diffusion and to avoid the drawing of material from the interface film. A more gradual precipitation provides a substantially uniform and improved enrichment for any one step. Similarly, agitation reduces the thickness of the interface film thereby reducing the time necessary for diffusion of material between the solution and the crystal nucleus. Throughout the treatment of the solution, the main consideration is to maintain a homogeneous solution. Gradations of concentration, pH, temperature, etc., should be minimized within the system. In addition to agitation of the solution, the addition of reagents in spray or aerosol form is preferred to addition of the reagents in large drops. Slow addition of the reagents in small amounts is also beneficial.

The precipitation treatment should be stopped prior to the appearance of visible turbidity for good separation. At the point where visible turbidity appears, the diameter of the particles is of the order of $10^{-5}$ centimeters, and the particles consist of several thousand molecular layers; decisive defects in the particles may have already occurred. Precipitation is preferably effected as close to the threshold point as possible. By "threshold point" is meant that point at which a slight change of any process variable in a direction favoring precipitation causes precipitation to occur.

One method which may be employed to effect precipitation, at, or near, the threshold point is to adjust the process variables of the system to values which exceed the values at the threshold point, as shown by the beginning of visible turbidity, or by the Tyndall effect; the variables are then readjusted so as to just redissolve the crystal nuclei, followed by a reversal of the system by very slight, incremental changes in the variables whereby precipitation is effected.

By "a value exceeding the threshold value" is meant merely that the value is such that precipitation will occur, and not that the value is numerically greater than the threshold value. Thus, for a solution of a salt which decreases in solubility with decreasing temperature, the threshold value of temperature is the temperature at saturation; and a value of temperature exceeding the threshold value is a temperature lower than the saturation temperature.

As a further illustration of the preferred precipitating technique, a precipitating agent may be added until turbidity is observed. By raising the temperature slightly, the crystal nuclei may be redissolved. Subsequent seeding of the solution with crystal nuclei of the least soluble of the salts to be precipitated coupled with a very gradual cooling of the solution causes precipitation at, or near, the threshold points.

As an aid to maintaining conditions, at, or near, the threshold value, the use of complexes which dissociate slowly has been found to be advantageous. Particularly, good results may be had if the complex ions employed dissociate at a rate slower than the rate of material exchange through the interface film between the crystal nuclei and the solution.

In order to save time during treatment, the environmental conditions such as pH, temperature, etc., may be changed rapidly up to the threshold point provided the values at the threshold point are not exceeded; subsequent changes should then be in small increments as discussed previously.

Failure to maintain homogeneous conditions and to alter the environmental conditions in small increments may give rise to an incomplete separation and a contaminated product since the values of the variables at the threshold point of each of the metals to be separated may differ by only minor amounts, e.g., only a few hundredths of one pH unit.

In approaching the threshold point during separation by crystallization or precipitation, when continuous and vigorous agitation of the reaction mixture are employed, the most advantageous rates of change of the environmental conditions are shown in Table I.

TABLE I

| Variables | Preferred Maximum Rate of Change |
|---|---|
| Temperature | 0.1° C. per minute. |
| pH | 0.1 pH unit per hour. |
| Concentration of ions | 1 relative percent per hour. |

Throughout the separations, dilute solutions containing less than 50 grams per liter, and preferably between 1 and 10 grams per liter, of the elements to be separated (calculated as oxides) are preferred.

The following examples illustrate techniques in accordance with the teachings of the present invention for effecting separations of mixtures of metallic materials which are normally difficult to separate.

*Example I*

In a common preparation of the rare earths, cerium is removed as a basic ceric salt, and the yttrium earths are removed by repeated fractional crystallization, leaving a solution comprising a mixture of lanthanum, praseodymium, and neodymium ammonium nitrate as well as considerable amounts of samarium and yttrium earths. The hot nitrate solution is treated with ammonium oxalate whereby the rare earth metals are precipitated as oxalates. The fine-grained precipitate is filtered, thoroughly washed with water, and dissolved as rare earth metal aluminum oxalato complex ions in a boiling aqueous 10 percent solution of ammonium alum solution with vigorous stirring. About 5 kilograms of ammonium alum are required for a kilogram of the mixture of rare earth metal oxalates. An aqueous solution of ammonium oxalate (saturated at 20° C. to 30° C.) is slowly added at a temperature of 70° C. to 80° C. with intensive stirring to the solution containing the rare earth metal aluminum oxalato complex ions. Throughout this treatment the temperature of the solution is maintained in the range of 70° C. to 80° C. The ammonium oxalate solution is added very gradually, and in small proportions until a slight turbidity appears. At this point, the addition of ammonium oxalate is stopped. With intensive stirring and careful maintenance of the precipitation temperature, the complete precipitation of the first fraction occurs. This precipitate is allowed to settle for about an hour in the hot solution, and then separated by either decantation or filtration techniques. The filtrate obtained is again treated with ammonium oxalate as before and a second fraction is obtained. A third frction is obtained by treating the remaining filtrate with the ammonium oxalate solution until no further precipitation is achieved and separating the precipitate. The filtrate obtained from this step is treated with 10 percent oxalic acid and the precipitate separated, and the last fraction is obtained by acidifying the filtrate with dilute (1:3) hydrochloric acid. Table II shows the rare earth metal composition of the several fractions.

TABLE II

| Fraction | Precipitant | Fraction Composition |
|---|---|---|
| 1 | ammonium oxalate | yttrium earth metals plus traces of samarium. |
| 2 | do | remaining samarium with traces of neodymium. |
| 3 | do | remaining neodymium with traces of praseodymium. |
| 4 | 1040 Oxalic acid | remaining praseodymium with small amounts of lanthanum. |
| 5 | dilute hydrochloric acid | substantially pure lanthanum. |

By this method up to 90 percent of the rare earth metals may be obtained in highly concentrated single fractions. By repeating this procedure a second time the individual rare earth metals may be isolated in spectroscopically pure form. In the second operation, the precipitate employed in the fractional precipitation may be chosen in accordance with the composition of the fraction being treated. Thus, a second operation on the first fraction might most advantageously employ a few more ammonium oxalate fraction precipitation with no need for treatment with hydrochloric acid, whereas a second operation of the fifth fraction might most advantageously employ only oxalic acid and/or hydrochloric acid fractional precipitations with no ammonium oxalate treatment.

Example II

The alkaline decomposition of monazite sand leaves an insoluble hydroxide residue which may be separated by filtration and washed free of sodium phosphate. The washed hydroxides are then heated to red heat in air to convert them to oxides, which are, in turn, leached with a boiling 10 percent solution of an aluminum salt, preferably aluminum nitrate. All of the rare earths in the residue, with the exception of thorium oxide, cerium oxide and uranium oxide dissolve as water-soluble aluminum complexes. The rare earth metals may then be fractionally precipitated from the solution in the same manner as in the previous example.

The insoluble mixture of cerium, thorium, and uranium oxide remaining after the leaching step is treated with hydrogen under reducing conditions whereby cerium is reduced to the trivalent state. The mixture is then leached with a 10 percent aluminum nitrate solution whereby the cerium is dissolved and separated, leaving insoluble oxides of thorium and uranium. These oxides are converted to sulfates which are dissolved in an ammoniacal aluminum oxalic acid solution. About 1500 cubic centimeters of a 1.0 molar solution of aluminum oxalic acid are used per kilogram of sulfate mixture. The treating solution may contain an excess of ammonia and oxalic acid without detrimental effects. A solution consisting of 7 parts of cold saturated ammonium oxalate solution and 3 parts of concentrated hydrochloric acid is added slowly at 70° C. to 80° C. with vigorous stirring to the thorium- and uranium-containing solution until the appearance of turbidity. A fine crystalline precipitate containing all of the thorium in pure form results. The uranium remains in solution and may be precipitated as the uranate with ammonia.

The leach liquor containing the cerium aluminum nitrate may be further purified by fractional precipitation with ammonium oxalate in accordance with the previous examples, with the middle fraction containing substantially pure cerium.

Example III

The separation of columbium and tantalum may be effected by converting the metals to oxalato complexes and fractionally precipitating the metal components from solution. However, this technique is complicated by the formation of a mixed columbium and tantalum oxalato complex which is more stable than the individual complexes. By incorporating another metal such as aluminum, chromium, molybdenum, tungsten, etc., in the complex, this difficulty can be avoided. Similarly, by converting the columbium and tantalum values to complex ions with metals such as those just mentioned and polybasis organic acids, particularly the dibasic and tribasic organic acids, an efficient separation may be obtained as follows. A mixture of freshly prepared niobic and tantalic acids in an amount equivalent to 10 grams of the corresponding oxides, is dissolved at 60° C. in 100 cubic centimeters of a 50 percent solution of potassium hydroxide. The solution is diluted with 50 cubic centimeters of water. To the diluted solution is added dropwise, with vigorous stirring, a one-molar aluminum oxalic acid solution containing 560 grams of aluminum oxalic acid per liter until the pH of the solution is 8. At this point, no further aluminum oxalic acid is added; for the next half hour the solution is maintained at 60° C. and is stirred vigorously. For the next two hours the solution is maintained at a constant temperature and the pH is maintained at 8, without stirring. Any decrease in pH is counteracted by the addition of ammonia. During this period the tantalum precipitates as an insoluble oxalate whereas the columbium remains in solution as an aluminum oxalato complex at this pH value. Failure to maintain the pH at 8 may result in the pH dropping below the threshold pH value for columbium, thereby causing columbium contamination of the precipitate. The precipitate is separated by filtration and washed with a 4.6 percent solution of ammonium oxalate which has been adjusted to a pH of 8.

The filtrate is treated with a solution consisting of 9 parts of 1:3 hydrochloric acid-water solution, and one part of 4.6 percent ammonium oxalate. Throughout the addition the solution is stirred vigorously, and maintained at a temperature of about 60° C. The solution is maintained at 60° C. for two hours and the precipitate is allowed to settle. The precipitate is then filtered and washed with warm water.

Each of the precipitated fractions was dissolved in hydrochloric acid and subjected to spectrophometric analysis. The first fraction consisted of tantalum completely free of columbium and with only 0.1 percent titanium oxide. The second fraction consisted of 99.5 percent columbium, the remainder being titanium.

Example IV

As another example of tantalum-columbium separation, a tantalum-iron alloy which also contains columbium may be broken up into its component parts either for separation or analytical purposes by the method of the present invention as follows. The alloy is completely dissolved at 40° C. in a mixed acid comprising 10 parts of hydrofluoric acid and one part of nitric acid. Three liters of the mixed acid are used for each kilogram of alloy. Columbium and tantalum are precipitated together as the corresponding acids by the addition of ammonium hydroxide to the solution. The precipitate is washed with a 1 to 2 percent solution of acetic acid to remove any residual iron, and the purified materials are converted into the corresponding oxides by ignition.

A mixture comprising one part of the oxide mixture and 15 parts of potassium bisulfate is prepared and fused at a temperature of 400° C. to 500° C. The fused mixture is cooled, and dissolved in three liters of a 1.6 molar aluminum-oxalic acid solution, whereby the columbium and tantalum values are converted to complex aluminum oxalato ions. The solution is heated to, and maintained at, a temperature in the range of 40° C. to 50° C. for precipitation. The precipitating solution comprises 1 part of a cold saturated ammonium oxalate solution and 9 parts of 2 N hydrochloric acid. The separation is effected in three steps. The first fraction contains 98 to 99 percent of the tantalum. In the second fraction, columbium precipitates with the remaining tantalum. The third fraction consists of substantially pure columbium and accounts for the major portion of the columbium in the sample.

Example V

Freshly precipitated oxalates of rare earth metals are dissolved in a 1.6 molar solution of aluminum oxalic acid to form a saturated solution containing from 6 to 8 weight percent of the rear earth metals. The metals are present in solution as aluminum oxalato complex ions. However, the stability of the complex ions varies according to the rare earth metal that is contained in each complex ion. Since the stability is not very great, it is possible to effect the dissociation of the complex ion by dilution, thereby precipitating the metals as insoluble oxalates. The order of precipitation proceeds sequentially according to the atomic number of the metal, with those metals having the highest atomic numbers precipitating first. Thus, by diluting the saturated solution of the rare earth metals while maintaing a homogeneous environment, highly enriched fractions of the therbium earth metals, of the rare earth metals of the erbium groups, of samarium, of europium, of gadolinum and of neodymium and praseodymium are easily obtained. Lanthanum remains in solution or is precipitated in the final fraction.

Example VI

The oxalates of rare earth metals are dissolved in solutions of aluminum salts, or the nitrate or chlorides or other soluble salts of the rare earth metals with mineral acid anions are dissolved in solutions of aluminum oxalic acid. In either case, aluminum oxalato mineral acid complex ions of the rare earth metals are formed. The aluminum oxalato mineral acid complex ions of the rare earth metals are decomposed in a homogeneous environment by the gradual lowering of the pH by the stepwise addition of oxalic acid and mineral acids. The resulting precipitates are separated in fractions as they form. These fractions are very strongly enriched in the individual rare earth metals, starting with scandium and yttrium and proceeding over the elements from atomic number 71 to 57. After only a single precipitation, fractions are obtained containing the individual rare earth metals in a high state of purity.

It is also possible to treat other elements than those of groups IIIB, IVB and VB of the periodic table in the same way by carrying out the fractional separation in a substantially homogeneous medium. This applies e.g. for the separation of earth alkali metals, of metals of the iron group, of metals of the manganese group, of metals of the platinum group etc.

Further, when separating elements by the process of the invention, the complex compounds upon cleavage may give rise to compounds serving as buffering agents thus maintaining the substantial homogeneity.

When using the novel concept of the homogeneous system the process of the invention can also be carried out without any complex compound being necessary. For example it will be possible to effect separation and purification of the platinum and palladium group of metals in a single or at the most a two stage process. Similarly, e.g. rare earths can be separated without relying on specific complex compounds.

What is claimed is:

1. In a process for separating a mixture of values of at least two metals selected from the group consisting of metals of groups IIIB, IVB and VB of the periodic table into its components by the fractional precipitation of said metal values from an aqueous solution, the improvement which comprises fractionally precipitating the metal values from an aqueous solution prepared by intimately contacting the mixture of metal values with a source of aluminum cations, and with a source of radicals of at least one polybasic organic acid selected from the group consisting of oxalic acid, citric acid and tartaric acid, whereby the metal values are dissolved in said solution as complex ions having a greater degree of chemical dissimilarity than the cations of said metal values thereby permitting more effective separation of the metal values.

2. In a process for separating a mixture of values of at least two metals selected from the group consisting of metals of groups IIIB, IVB and VB of the periodic table into its components by the fractional precipitation of said metal values from an aqueous solution, the improvement which comprises fractionally precipitating the metal values from an aqueous solution prepared by effecting the conversion of the metal values to a salt of at least one polybasic organic acid selected from the group consisting of oxalic acid, citric acid and tartaric acid; treating said salt of said polybasic organic acid with a solution containing aluminum cations, whereby the metal values are dissolved in said solution as complex ions having a greater degree of chemical dissimilarity than the cations of said metal values thereby permitting more effective separation of the metal values.

3. In a process for separating a mixture of values of at least two metals selected from the group consisting of metals of groups IIIB, IVB and VB of the periodic table into its components by the fractional precipitation of said metal values from an aqueous solution, the improvement which comprises fractionally precipitating the metal values from an aqueous solution prepared by intimately contacting the mixture of metal values with an aqueous solution containing aluminum cations and radicals of at least one organic acid selected from the group consisting of oxalic acid, citric acid and tartaric acid whereby the metal values are dissolved in said solution as complex ions having a greater degree of chemical dissimilarity than the cations of said metal values thereby permitting more effective separation of the metal values.

4. A process in accordance with claim 1 wherein said source of aluminum cations is a salt with said source of radicals of said polybasic organic acid.

References Cited in the file of this patent

UNITED STATES PATENTS

| 2,199,696 | Fleck | May 7, 1940 |
| 2,741,628 | Plucknett | Apr. 10, 1946 |
| 2,767,044 | Hill et al. | Oct. 16, 1956 |
| 2,780,518 | Gates et al. | Feb. 5, 1957 |
| 2,819,146 | Ruhoff et al. | Jan. 7, 1958 |
| 2,819,945 | Ruhoff | Jan. 14, 1958 |
| 2,832,793 | Duffield | Apr. 29, 1958 |

OTHER REFERENCES

Mellor: "Comprehensive Treatise on Inorganic and Theoretical Chemistry," vol. 5 (1924), pages 483, 484, 545, 569 and 570. Longmans, Green & Co., London.

Rodden: "Analytical Chemistry of the Manhattan Project," (1950), page 6, McGraw-Hill Book Co., Inc., New York.

Hodgman: "Handbook of Chemistry and Physics," pages 602 and 603 (1952 ed.), Chemical Rubber Publishing Co., Cleveland, Ohio.